United States Patent [19]

Nouda et al.

[11] Patent Number: 4,557,982
[45] Date of Patent: Dec. 10, 1985

[54] MAGNETIC RECORDING FLEXIBLE DISC

[75] Inventors: Hiroshi Nouda, Sagamihara; Kinji Hasegawa, Yokohama; Masahiro Hosoi, Sagamihara, all of Japan

[73] Assignee: Teijin Limited, Osaka, Japan

[21] Appl. No.: 597,692

[22] Filed: Apr. 6, 1984

[30] Foreign Application Priority Data

Apr. 7, 1983 [JP] Japan ................... 58-60041
Sep. 27, 1983 [JP] Japan ................. 58-176968

[51] Int. Cl.$^4$ ............................ G11B 5/62; G11B 5/82
[52] U.S. Cl. .................................... 428/694; 427/128; 360/135; 428/900; 428/910; 428/480
[58] Field of Search .............. 428/694, 695, 900, 480, 428/409, 910; 427/128; 264/210.7, 235.8, 290.2; 360/134–136

[56] References Cited

U.S. PATENT DOCUMENTS

| | | | |
|---|---|---|---|
| 2,884,663 | 5/1959 | Alles | 18/48 |
| 3,284,223 | 11/1966 | Watson | 428/900 |
| 3,501,344 | 3/1970 | Watson | 428/694 |
| 4,316,927 | 2/1982 | Kimura | 428/694 |
| 4,318,957 | 3/1982 | Videc | 428/694 |
| 4,497,865 | 2/1985 | Minami | 428/694 |
| 4,508,782 | 4/1985 | Mira | 428/694 |

OTHER PUBLICATIONS

"1,4–Cyclohexanedimethanol", Eastman Kodak, TDR No. X172, Jul. 1965.

*Primary Examiner*—Ellis P. Robinson
*Attorney, Agent, or Firm*—Sherman & Shalloway

[57] ABSTRACT

A magnetic recording flexible disc composed of a polyester film substrate having formed thereon a magnetic layer, the improvement wherein said polyester film is a biaxially oriented film consisting of poly-1,4-cyclohexylene dimethylene terephthalate wherein at least 90 mole % of a glycol component is 1,4-cyclohexanedimethanol and at least 80 mole % of an acid component is terephthalic acid, a maximum value of a temperature dependent expansion in the surface direction of the film is $9 \times 10^{-6}$ to $35 \times 10^{-6}/°C.$, a maximum value of a humidity dependent expansion in the surface direction of the film is 0 to $8.0 \times 10^{-6}/\%$ RH, the difference between the maximum and minimum values of the temperature dependent expansion in the surface direction of the film is 0 to $8.0 \times 10^{-6}/°C.$, and the difference between the maximum and minimum values of the humidity dependent expansion in the surface direction of the film is 0 to $3.0 \times 10^{-6}/\%$ RH.

2 Claims, No Drawings

MAGNETIC RECORDING FLEXIBLE DISC

This invention relates to a magnetic recording flexible disc capable of avoiding a tracking miss, and more specifically to a magnetic recording flexible disc capable of recording at a high tracking density.

It has been hitherto known to prevent a tracking miss by providing a magnetic flexible disc recording and playback device itself with a mechanism for controlling a temperature change or a special circuit (track serbo, etc.) of detecting a track. These means are inherently not universal because they make the recording and playback device complicated. There has been actually employed a means of preventing a tracking miss by producing magnetic flexible discs with base films and magnetic materials whose temperature dependent expansion and humidity dependent expansion are as low as possible.

However, when such magnetic flexible discs are used at high temperatures (40° to 50° C.) and/or high humidity (about 80% RH), a tracking miss occurs. In particular, when a magnetic flexible disc that undergoes recording at low temperatures (about 10° C.) and/or low humidity (about 20% RH) is subjected to playback in an ambient atmosphere of high temperatures (about 40° C.) and high humidity (about 60 to 80% RH), a tracking miss undersirously occurs. The tracking miss leads to the decrease in output envelope, and a problem that an S/N ratio worsens is still unresolved.

An object of this invention is to provide an improved magnetic recording flexible disc wherein the range of available conditions of an ambient atmosphere is enlarged such that no tracking miss occurs even under conditions of high temperatures and high humidity.

The present inventors have made studies to remedy the above-described defects and consequently found that if a magnetic recording flexible disc is produced using as a substrate a film of a high dimensional stability obtained by adjusting a temperature dependent expansion and a humidity dependent expansion of a biaxially oriented film consisting of poly-1,4-cyclohexene dimethylene terephthalate [poly(cyclohexane 1,4-dimethylene terephthalate)] to specific ranges, not only occurrence of tracking miss can be avoided, but also a high density in magnetic recording is provided, above all, a tracking density is also improvable.

Thus, the present invention is to provide a magnetic recording flexible disc composed of a polyester film substrate having formed thereon a magnetic layer, characterized in that said polyester film is a biaxially oriented film consisting of poly-1,4-cyclohexylene dimethylene terephthalate wherein at least 90 mole % of a glycol component is 1,4-cyclohexanedimethanol and at least 80 mole % of an acid component is terephthalic acid, a maximum value of a temperature dependent expansion in the surface direction of the film is $9 \times 10^{-6}$ to $35 \times 10^{-6}/°C.$, preferably $9 \times 10^{-6}$ to $25 \times 10^{-6}/°C.$, a maximum value of a humidity dependent expansion in the surface direction of the film is 0 to $8.0 \times 10^{-6}/\%$ RH, preferably 0 to $5.0 \times 10^{-6}/\%$ RH, the difference between the maximum and minimum values of the temperature dependent expansion in the surface direction of the film is 0 to $8.0 \times 10^{-6}/°C.$, preferably 0 to $5.0 \times 10^{-6}/°C.$, and the difference between the maximum and minimum values of the humidity dependent expansion in the surface direction of the film is 0 to $3.0 \times 10^{-6}/\%$ RH, preferably 0 to $2.5 \times 10^{-6}/\%$ RH.

(Hereinafter, the terms "in the surface direction of the film" are sometimes omitted when referring to the respective expansions.)

The magnetic recording flexible disc of this invention is obtained by forming the magnetic layer on the biaxially oriented film of poly-1,4-cyclohexylene dimethylene terephthalate and if required, subjecting the magnetic layer to a surface smoothing treatment. Moreover, the biaxially oriented film of poly-1,4-cyclohexylene dimethylene terephthalate can be manufactured by a film-forming operation properly controlled to satisfy the conditions of the temperature dependent expansion and humidity dependent expansion.

The magnetic recording flexible disc of this invention is composed of the magnetic layer and film substrate. The magnetic layer is made of a magnetic powder or metallic thin film. As the ferromagnetic powder or metallic thin film in this invention, known ferromagnetic bodies are available such as $\gamma$-$Fe_2O_3$, $\gamma$-$Fe_2O_3$ containing Co, $Fe_3O_4$, $Fe_3O_4$ containing Co, $CrO_2$, Co-Ni-P alloy, Co-Ni-Fe alloy, Co-Cr alloy, Co-Ni alloy, barium ferrite, etc.

The magnetic powder is mixed with a binder and coated on the film substrate. Examples of the binder are known thermoplastic resins, thermosetting resins, reactive resins, etc. such as a vinyl chloride/vinyl acetate copolymer, vinyl chloride/vinylidene chloride copolymer, vinyl chloride/acrylonitrile copolymer, acrylate/acrylonitrile copolymer, acrylate/vinylidene chloride copolymer, acrylate/styrene copolymer, methacrylate/acrylonitrile copolymer, methacrylate/vinylidene chloride copolymer, methacrylate/styrene copolymer, urethane elastomer, polyvinyl fluoride, vinylidene chloride/acrylonitrile copolymer, butadiene/acrylonitrile copolymer, polyamide resin, polyvinyl butyral, cellulose derivatives (cellulose acetate butyrate, cellulose diacetate, cellulose triacetate, cellulose propionate, nitrocellulose, etc.), styrene/butadiene copolymer, polyester resin, chlorovinylether/acrylate copolymer, amino resins, thermoplastic resins of various synthetic rubbers, mixtures of these, and so forth.

The magnetic layer is coated onto the film substrate by a method such as air doctor coating, blade coating, air knife coating, squeeze coating, dip coating, reverse-roll coating, transfer-roll coating, gravure coating, kiss coating, cast coating or spray coating.

The magnetic layer is coated to a thickness of 0.1 to 20 microns onto the film substrate. It is advisable that the coated surface is subjected to a calendering treatment to make it smooth.

Poly-1,4-cyclohexylene dimethylene terephthalate can be made by a common method of producing polyesters which has been so far known. For instance, it can be formed by the direct esterification reaction between terephthalic acid and 1,4-cyclohexanedimethanol or the ester interchange reaction between dimethyl terephthalate and 1,4-cyclohexanedimethanol. In these reactions, a third component may be copolymerized in a small proportion.

Poly-1,4-cyclohexylene dimethylene terephthalate used in this invention must be one containing at least 80 mole % of terephthalic acid in the acid component. Where the proportion of terephthalic acid is less than the above value, it is impossible to meet the above conditions of the temperature dependent expansion and humidity dependent expansion. Examples of the third component available in this invention are isophthalic acid, oxalic acid, succinic acid, adipic acid, 2,6-naphthalenedicarboxylic acid, etc. so far as the amount is less than 20 mole %. At least 90 mole % of the glycol component in poly-1,4-cyclohexylene dimethylene terephthalate has to be 1,4-cyclohexanedimethanol. Where the proportion of 1,4-cyclohexanedimethanol is less than the above, no satisfactory film results. As the third component, ethylene glycol, propylene glycol, 1,4-butanediol, etc. are available so long as the proportion is less than 10 mole %.

Said 1,4-cyclohexanedimethanol includes a cis-isomer and trans-isomer. A slight difference in properties is found according to their mixing proportions. However, no great influence is given to properties of films within the range of cis/trans=4/6 to 0/10.

The film of poly-1,4-cyclohexylene dimethylene terephthalate may contain, for example, stabilizers such as phosphoric acid, phosphorous acid, esters of these acids, etc., delustering agents such as titanium dioxide, finely divided silica, kaolin, calcium carbonate, calcium phosphate, etc., lubricants, and the like.

When the biaxially oriented film of poly-1,4-cyclohexylene dimethylene terephthalate meets the above-defined conditions of the temperature dependent expansion and humidity dependent expansion, the tracking miss of the flexible disc can be prevented, and the flexible disc be used at wide-ranging temperatures and humidity. When the maximum value of the temperature dependent expansion or the maximum value of the humidity dependent expansion exceeds the above-defined range, a magnetic head and a recording track are deviated from each other in case playback is conducted at temperatures different from those in an ambient atmosphere recorded in the magnetic recording flexible disc. This is because the extension from the center of the magnetic flexible disc alters due to the difference in the temperature dependent expansion or humidity dependent expansion. It leads to occurrence of the tracking miss. As a consequence, an output changes and drop out takes place.

In a polyester film of polyethylene terephthalate which has now been most commonly used in a magnetic recording flexible disc, the maximum value of the temperature dependent expansion is about $17 \times 10^{-6}/°C.$, and the difference between the maximum and minimum values of the temperature dependent expansion is about $8 \times 10^{-6}/°C$. Such a film has no problem since the temperature dependent expansion is approximately consistent with that in a recording and playback device. However, it is impossible to completely prevent off-track owing to the difference in temperature dependent expansion. In the case of said film, the humidity dependent expansion is as high as about $11 \times 10^{-6}/\%$ RH, and off-track corresponding to humidity change becomes fairly great as the humidity dependent expansion of the recording and playback device (flexible disc drive) is estimated at zero.

On the other hand, the use of the biaxially oriented film made of 1,4-cyclohexylene dimethylene terephthalate in this invention provides less off-track involved in the temperature dependent expansion and humidity dependent expansion than the use of the biaxially oriented polyester film made of polyethylene terephthalate. Moreover, the off-track can be further controlled by minimizing the difference between the maximum and minimum values of the temperature dependent expansion and the difference between the maximum and minimum values of the humidity dependent expansion. Thus, the use in the ambient atmosphere at the wide-ranging temperatures and humidity poses no problem.

Especially useful as the biaxially oriented film of poly-1,4-cyclohexylene dimethylene terephthalate in this invention is one wherein a refractive index in each direction of the film surface is 1.585 to 1.650, preferably 1.590 to 1.630, a density is 1.220 to 1.250 g/cm, preferably 1.224 to 1.240 g/cm, a maximum value of a temperature dependent expansion is $20 \times 10^{-6}$ to $35 \times 10^{-6}/°C.$, preferably $20 \times 10^{-6}$ to $25 \times 10^{-6}/°C.$, a maximum value of a humidity dependent expansion is $3 \times 10^{-6}$ to $8.0 \times 10^{-6}/\%$ RH, preferably $3 \times 10^{-6}$ to $7.0 \times 10^{-6}/\%$ RH, a difference between maximum and minimum values of the temperature dependent expansion is 0 to $6.0 \times 10^{-6}/°C.$, preferably 0 to $4.0 \times 10^{-6}/°C.$, and a difference between maximum and minimum values of the humidity dependent expansion is 0 to $3.0 \times 10^{-6}/\%$ RH, preferably 0 to $2.5 \times 10^{-6}/\%$ RH.

If the refractive index is less than 1.585, orientation of a molecular chain is insufficient, and a strength, above all, a Young's modulus of the film is not enough for the engineering usage. Meanwhile, if the refractive index is more than 1.650, a refractive index in a direction of 90° relative to the above is less than 1.580 which leads to increase in deflection of the orientation of the molecular chain. Since one of the objects of this invention is to provide a film with good balance in orientation which is useful as a film for liquid crystal display sheet of flexible disc, such a deflection of the orientation of the molecular chain is unwanted. Said refractive index is more preferably within the range of 1.590 to 1.630 which permits the well-balanced orientation. The density is 1.220 to 1.250 g/cm. With the density less than 1.220, crystallization goes insufficient, making it impossible to obtain a desirous humidity dependent expansion. Though the higher density is better, it is difficult to exceed 1.250. Generally, the lower temperature dependent expansion is better. Nevertheless, in the film used as a substrate of a magnetic flexible disc, the temperature dependent expansion close to that of a disc driving device is desirous because off-track between the magnetic disc and head is minimized. Since the temperature dependent expansion of the disc driving device is easily set at about $20 \times 10^{-6}/°C.$, a value approximate to $20 \times 10^{-6}/°C.$ is preferably selected as the maximum value of the temperature dependent expansion of the film. Usually, the lower the humidity dependent expansion, the better in any usage. When the maximum value thereof is less than $8 \times 10^{-6}/\%$ RH, a better effect of improvement is clearly exhibited than in the case of the commonly used polyethylene terephthalate ($11 \times 10^{-6}/\%$ RH). The difference between the maximum and minimum values of the temperature dependent expansion is preferably $6 \times 10^{-6}/°C.$ or less, most preferably $4 \times 10^{-6}/°C.$ or less to minimize the off-track. The smaller difference between the maximum and minimum values of the humidity dependent expansion is also better to minimize the off-track. It is 0 to $3 \times 10^{-6}/\%$ RH or less, preferably 0 to $2.5 \times 10^{-6}/\%$ RH or less.

The film of poly-1,4-cyclohexylene dimethylene terephthalate in this invention is produced in the following manner.

It is suitable to dry polymer chips at 170° C. for about 3 hours, but these conditions are not critical. An extruder may be a usual one, but techniques such as a conjoint use with a measuring pump, pressure control, etc. are desirous to improve precision in extrusion. It is advisable to properly select temperatures of a melt of poly-1,4-cyclohexylene dimethylene terephthalate that vary with a polymer composition. The temperature range of 295° to 315° C. is usually selected. An appropriate temperature of a casting drum is 10° to 60° C. However, it is desirable that as the drum is closer to the poly-1,4-cyclohexylene dimethylene terephthalate homopolymer, it is more quenched. On this occassion, the suitable surface temperature is 20° to 40° C.

A stretching temperature is usually 80° to 140° C. When the temperature is lower than 80° C., a stretching unevenness occurs. When the temperature is higher than 140° C., the stretching effect tends to decrease. More preferably, the temperature range of 100° to 120° C. is selected, making it easy to provide the above-described properties.

A stretch ratio is 3.0 to 5.0, preferably 3.3 to 4.3 in a longitudinal direction, and 3.0 to 5.0, preferably 3.5 to 4.5 in a transverse direction. If the stretch ratio is less than the above range, the refractive index becomes less than the above-described value. If the stretch ratio exceeds the above range, films are frequently broken during the production, and even though the films are obtained, the humidity dependent expansion goes too high. The stretching may be conducted by a known method. For instance, the longitudinal stretching can be effected while heating the film between two rolls having a difference in circumferential speed, and the transverse stretching while heating the film with both ends held by clips and enlarging an interval of a row of clips, respectively.

The resulting biaxially oriented film is heat set at 150° to 260° C., preferably 180° to 250° C. for 1 to 100 seconds whereby the film of this invention having the above-described refractive index, density and expansions can result.

In the case of the film formed by the usual longitudinal and transverse stretching method, the difference between the maximum and minimum values each of the temperature dependent expansion and humidity dependent expansion in the vicinity of the center in the width direction is included in the range of this invention. However, what percentage is quantitatively included varies with the film-forming conditions, polymer composition, etc. Usually, 10 to 70% of the overall width is included in the range of this invention. Meanwhile, the difference between the maximum and minimum values each of the temperature dependent expansion and humidity dependent expansion in a portion close to both ends of the film in the width direction is great and commonly deviates from the range of this invention. It is attributable to a bowing phenomenon that occurs at the point of heat setting in a tenter. In order to minimize the difference between the maximum and minimum values each of the temperature dependent expansion and humidity dependent expansion everywhere in the width direction of the film, it is preferred, for example, that the heat setting is conducted at a temperature of 120° to 180° C. and after the film is once would up, the heat setting is carried out again at a temperature of 180° to 250° C. while unwinding the film and holding both ends of the film with clips. Thus, when the heat treatment is carried out more than twice under different heat treatment conditions, the influence of the bowing phenomenon can be eliminated by selecting the temperature conditions, and the difference between the maximum and minimum values each of the temperature dependent expansion and humidity dependent expansion be minimized throughout the entire film.

Since the optimum range of the treating conditions varies with the polymer composition, it is necessary to properly choose them. For example, in the case of a polymer containing 87 mole % of terephthalic acid and 13 mole % of isophthalic acid as acid components and 1,4-cyclohexanedimethanol as a glycol component, the heat setting conditions are preferably 230° to 240° C. and 20 to 40 seconds.

The biaxially oriented film of this invention can be formed to a proper thickness depending on its usage. The thickness of the film is 2 to 500 microns, usually 12 to 125 microns, and 50 to 100 microns for use in a flexible disc base.

In this invention, the properties are measured by the following methods.

(1) Refractive index:
Measured by an Abbe's refractometer.

(2) Density:
Measured by an n-heptan/carbon tetrachloride density gradient tube.

(3) Temperature dependent expansion:
The temperature dependent expansion is measured by placing a thermo mechanical analyzer TM-3000 manufactured by Shinku Riko K.K. A film sample 15 mm long and 5 mm wide which has been previously heat-treated at 70° C. for 30 minutes and then cooled is put in the analyzer. The maximum and minimum values of the temperature dependent expansion are measured by reading a dimensional change between a temperature of 10° C. and a relative humidity of 0% on one hand and a temperature of 40° C. and a relative humidity of 0% on the other in each of directions spaced apart with an angle of 15° along the surface of the film sample. A load in measuring the expansion is 3.75 kg per square centimeter of the sectional area of the film sample.

(4) Humidity dependent expansion:
A film sample previously treated at a temperature of 40° C. and a relative humidity of 90% is placed in the same analyzer as used in (3) above. The maximum and minimum values of the humidity dependent expansion are measured by reading a dimensional change between a temperature of 20° C. and a relative humidity of 30% on one hand and a temperature of 20° C. and a relative humidity of 70% on the other in each of directions spaced apart with an angle of 15° along the surface of the film sample. The size of the film sample and the load in measuring the humidity dependent expansion are the same as in measuring the above temperature dependent expansion.

(5) Off-track test (temperature change):
The off-track test is conducted as follows.
A magnetic recording flexible disc obtained by coating a magnetic layer, treating the coated surface with a calendering roll and punching it into a disc undergoes recording at a temperature of 15° C. and a relative humidity of 60%. A maximum output and an output envelope of the magnetic sheet on this occasion are measured. Subsequently, a maximum output and an output envelope are measured at a temperature of 40° C. and a relative humidity of 60%. Upon comparing the former output envelope with the latter, tracking conditions are estimated. As the difference is smaller or concretely smaller than 3 db, the tracking is estimated to be excellent (this is indicated by O in the table below). When the difference is more than 3 db, the tracking is estimated to be poor (this is indicated by X in the table below).

(6) Off-track test (humidity change):

The disc is subjected to recording at a temperature of 25° C. and a relative humidity of 20%, and an output envelope on this occasion is measured. An output envelope is then measured at a temperature of 25° C. and a relative humidity of 70%. Upon comparing both output envelopes, tracking conditions are estimated as in (5) above.

The following Examples and Comparative Examples illustrate this invention specifically.

EXAMPLES 1-6 AND COMPARATIVE EXAMPLES 1-3

Eighty-five mole % of terephthalic acid and 15 mole % of isophthalic acid as acid components, 1,4-cyclohexanedimethanol as a glycol component and 0.05 mole % (relative to the acid components) of titanium oxide as a catalyst were autoclaved and heated with stirring to conduct the ester interchange and then the polycondensation. There resulted poly-1,4-cyclohexylene dimethylene terephthalate composed of 1,4-cyclohexanedimethanol, terephthalic acid and isophthalic acid.

Meanwhile, polycyclohexylene-1,4-dimethylene terephthalate composed of 100 mole % of terephthalic acid and 100 mole % of 1,4-cyclohexanedimethanol was likewise obtained.

Polyethylene terephthalate was formed by a usual polymerization method.

These polyesters were melt-extruded at 300° C. to afford 1050-micron-thick unoriented films. Said unoriented films were then stretched 3.3 to 3.7X in a longitudinal direction at 90° to 120° C., and 3.4 to 3.8X in a transverse direction at 100° to 130° C. The stretched films were further heat set at 200° to 240° C. for 10 to 30 seconds to obtain 75-micron-thick biaxially oriented films different in film-forming conditions. A magnetic coating solution having the following formulation was coated on each of the resulting biaxially oriented films and the surface was treated with a calendering roll to form a 5-micron-thick magnetic layer.

|  | parts by weight |
|---|---|
| $\gamma$-$Fe_2O_3$ | 200 |
| Vinyl chloride/vinyl acetate copolymer resin (VAGH manufactured by Union Carbide Corp.) | 30 |
| Polyurethane (PP-88 manufactured by Nippon Polyurethane Kogyo K.K.) | 20 |
| Isocyanate compound (CORONATE HL manufactured by Nippon Polyurethane Kogyo K.K.) | 40 |
| Carbon (average size: 0.5 $\mu\phi$) | 20 |
| Dimethyl siloxane | 2 |
| Toluene | 70 |
| Methyl ethyl ketone | 70 |
| Cyclohexanone | 70 |

Subsequently, the film having the above magnetic layer was cut into a magnetic recording flexible disc 20 cm in outer diameter and 3.8 cm in inner diameter, and said disc was subjected to a recording and playback operation by a recording and playback device. A sheet recorder was rotated at 360 rpm and a position of a magnetic head was 8 cm from the center of the disc. A width of a track was 300 microns and a material of the head was ferrite. A signal of 1 MHz was recorded in the magnetic recording flexible disc under given conditions and played back under given conditions. The difference between output envelopes was measured and the results were indicated by O and X. (The envelopes of the magnetic recording flexible disc under conditions of 15° C. and 60% RH and of 25° C. and 20% RH were less than 0.2 db.)

The temperature dependent expansion and humidity dependent expansion were also measured for the individual films, and the results were shown in Table 1.

TABLE 1

|  | Polymer composition | Maximum value of temperature dependent expansion (/°C.) | Difference between maximum and minimum values of temperature dependent expansion (/°C.) | Maximum value of humidity dependent expansion (/% RH) | Difference between maximum and minimum values of humidity dependent expansion (/% RH) | Envelope in playback at 40° C. and 60% RH | Envelope in playback at 25° C. and 70% RH |
|---|---|---|---|---|---|---|---|
| Ex. 1 | Terephthalic acid 85 mole % Isophthalic acid 15 mole % 1,4-Cyclohexane-dimethanol 100 mole % | $24 \times 10^{-6}$ | $7 \times 10^{-6}$ | $6 \times 10^{-6}$ | $3 \times 10^6$ |  |  |
| Ex. 2 | Terephthalic acid 85 mole % Isophthalic acid 15 mole % 1,4-Cyclohexane-dimethanol 100 mole % | $20 \times 10^{-6}$ | $5 \times 10^{-6}$ | $5 \times 10^{-6}$ | $2.5 \times 10^{-6}$ |  |  |
| Ex. 3 | Terephthalic acid 85 mole % Isophthalic acid 15 mole % 1,4-Cyclohexane-dimethanol 100 mole % | $17 \times 10^{-6}$ | $4 \times 10^{-6}$ | $4 \times 10^{-6}$ | $1.8 \times 10^{-6}$ |  |  |
| Ex. 4 | Terephthalic acid 85 mole % Isophthalic acid 15 mole % 1,4-Cyclohexane- | $22 \times 10^{-6}$ | $6 \times 10^{-6}$ | $5 \times 10^{-6}$ | $2 \times 10^{-6}$ |  |  |

TABLE 1-continued

| | Polymer composition | Maximum value of temperature dependent expansion (/°C.) | Difference between maximum and minimum values of temperature dependent expansion (/°C.) | Maximum value of humidity dependent expansion (/% RH) | Difference between maximum and minimum values of humidity dependent expansion (/% RH) | Envelope in playback at 40° C. and 60% RH | Envelope in playback at 25° C. and 70% RH |
|---|---|---|---|---|---|---|---|
| | dimethanol 100 mole % | | | | | | |
| Ex. 5 | Polycyclohexylene-1,4-dimethylene terephthalate | $17 \times 10^{-6}$ | $5 \times 10^{-6}$ | $2 \times 10^{-6}$ | $1.8 \times 10^{-6}$ | | |
| Ex. 6 | Polycyclohexylene-1,4-dimethylene terephthalate | $33 \times 10^{-6}$ | $6 \times 10^{-6}$ | $3 \times 10^{-6}$ | $2 \times 10^{-6}$ | | |
| Comp. Ex. 1 | Polycyclohexylene-1,4-dimethylene terephthalate | $37 \times 10^{-6}$ | $8 \times 10^{-6}$ | $3 \times 10^{-6}$ | $3 \times 10^{-6}$ | X | |
| Comp. Ex. 2 | Terephthalic acid 85 mole % Isophthalic acid 15 mole % 1,4-Cyclohexane-dimethanol 100 mole % | $39 \times 10^{-6}$ | $9 \times 10^{-6}$ | $5 \times 10^{-6}$ | $3 \times 10^{-6}$ | X | |
| Comp. Ex. 3 | Polyethylene terephthalate | $17 \times 10^{-6}$ | $7 \times 10^{-6}$ | $12 \times 10^{-6}$ | $5 \times 10^{-6}$ | | X |

EXAMPLE 7

Eighty-five mole % of terephthalic acid and 15 mole % of isophthalic acid as dibasic acid components, 1,4-cyclohexanedimethanol as a glycol component, 0.05 mole % (relative to the acid components) of titanium oxide as a catalyst and 0.5% by weight of kaolin clay having an average particle size of 0.6 micron as a lubricant were autoclaved and heated with stirring to conduct the ester interchange and then the polycondensation. There resulted poly-1,4-cyclohexylene dimethylene terephthalate.

This polyester was melt-extruded at 300° C. and cooled on a quenching drum held at 40° C. to obtain a 1000-micron-thick unoriented film. The unoriented film was preheated in contact with a metallic roll adjusted to 90° C. Thereafter, the preheated film was stretched 3.6X in a longitudinal direction between rolls different in circumferential speed while subjecting the film to irradiation by an infrared heater (surface temperature 1000° C.). Successively, the longitudinally stretched film was stretched 3.7X at 115° C. in a transverse direction with a tenter. While holding both ends of the resulting biaxially oriented film with clips, said film was heat set at 140° C. and wound up. The film was then held at both ends while unwinding it, and heat set again at 235° C. to provide a 75-micron-thick product. The properties of the product are shown in Table 2.

EXAMPLE 8

The procedure in Example 7 was followed except that the amount of terephthalic acid as a dibasic acid component was changed to 100 mole %, the melting temperature to 310° C., the temperature of the quenching drum to 20° C., the preheating temperature to 80° C., the first heat setting temperature to 180° C. and the second heat setting temperature to 250° C. respectively. As a consequence, a 75-micron-thick biaxially oriented film was obtained. The properties of said film are shown in Table 2.

EXAMPLE 9

The procedure in Example 7 was followed except that the first heat setting was perfomed at 235° C. and the second heat setting was omitted. There resulted a 75-micron-thick biaxially oriented film. The properties of said film are shown in Table 2.

Comparative Example 4

Polyethylene terephthalate prepared in a usual manner was treated as in Example 7 except that the melting temperature was changed to 290° C., the temperature of the quenching drum to 20° C., the preheating temperature in the longitudinal stretching to 80° C., the transverse stretching temperature to 105° C. and the second heat setting temperature to 225° C., respectively. There resulted a 75-micron-thick biaxially oriented film. The properties of the film are shown in Table 2.

Comparative Example 5

A 75-micron-thick biaxially oriented film was obtained in quite the same way as in Example 8 except that the stretch ratio was changed to 4.3 in a longitudinal direction and 3.5 in a transverse direction. The properties of the film are shown in Table 2.

The value in the center each of the films obtained in Examples 7, 8 and 9 meets the value specified in this invention.

TABLE 2

| | Polymer composition | Refractive index in each direction | | Density (g/cm³) | $\alpha t(\times 10^{-6}/°C.)$ | | $\alpha h(\times 10^{-6}/\% RH)$ | | $\Delta\alpha t$ | | $\Delta\alpha h$ | |
|---|---|---|---|---|---|---|---|---|---|---|---|---|
| | | Film center | End | | Film center | End | Film center | End | Film center | End | Film center | End |
| Ex. 7 | Terephthalic acid 85 mole % | 1.599–1.603 | 1.597–1.605 | 1.228 | 34–38 | 33–39 | 6 | 6 | 4 | 6 | 0 | 0 |

TABLE 2-continued

| | Polymer composition | Refractive index in each direction | | Density (g/cm³) | $at(\times 10^{-6}/°C.)$ | | $ah(\times 10^{-6}/\% RH)$ | | $\Delta at$ | | $\Delta ah$ | |
|---|---|---|---|---|---|---|---|---|---|---|---|---|
| | | Film center | End | | Film center | End | Film center | End | Film center | End | Film center | End |
| Ex. 8 | Isophthalic acid 15 mole % 1,4-Cyclohexane-dimethanol 100 mole % Poly-1,4-cyclo-hexylene dimethylene terephthalate | 1.620–1.625 | 1.620–1.625 | 1.230 | 24–26 | 24–26 | 4 | 4 | 2 | 2 | 0 | 0 |
| Ex. 9 | Terephthalic acid 85 mole % Isophthalic acid 15 mole % 1,4-Cyclohexane-dimethanol 100 mole % | 1.599–1.603 | 1.580–1.625 | 1.228 | 34–38 | 25–47 | 6 | 5–8 | 1 | 3 | 0 | 3 |
| Comp. Ex. 4 | Polyethylene terephthalate | 1.658–1.660 | 1.657–1.661 | 1.396 | 14–15 | 13–16 | 9 | 8–11 | 4 | 22 | 0 | 3 |
| Comp. Ex. 5 | Poly-1,4-cyclo-hexylene dimethylene terephthalate | 1.580–1.655 | 1.580–1.655 | 1.230 | 15–42 | 14–45 | 2–6 | 1–9 | 27 | 31 | 4 | 8 |

Note $at$: Temperature dependent expansion
$ah$: Humidity dependent expansion.
$\Delta at$: Difference between maximum and minimum values of temperature dependent expansion in each direction.
$\Delta ah$: Difference between maximum and minimum values of humidity dependent expansion in each direction.

From the foregoing Examples, it follows that in the discs wherein the maximum values of the temperature dependent expansion and humidity dependent expansion are within the ranges specified in this invention, the tracking miss improves (Examples 1–6) and the discs are available for recording and playback in an ambient atmosphere of high temperatures and high humidity. On the other hand, in the discs wherein the maximum values of the temperature dependent expansion and humidity dependent expansion are without the ranges specified in this invention, a tracking miss occurs (Comparative Examples 1–3). In this way, the discs of this invention are found to have a high industrial value as flexible discs with a high tracking density.

The magnetic recording flexible discs of this invention have an advantage that since no tracking miss occurs with the increased tracking density, a high-density recording is possible. This is ascribable to the fact that the off-track between the magnetic track and head little occurs because the films used as substrates in the flexible discs of this invention have much less humidity dependent expansion than commonly used polyethylene terephthalate films. Moreover, the flexible discs of this invention have profitably no tracking miss even though the conditions of temperatures and humidity are different in the recording and playback. Accordingly, the flexible discs of this invention are of wide application withstanding the change of the ambient atmosphere.

What we claim is:

1. A magnetic recording flexible disc composed of a polyester film substrate having formed thereon a magnetic layer, the improvement wherein said polyester film is a biaxially oriented film stretched in a longitudinal direction at a stretch ratio of 3.3 to 4.3 and stretched in a transverse direction at a stretch ratio of between 3.4 to 4.5, and consisting of poly 1,4-cyclo-hexylene dimethylene terephthalate wherein at least 90 mole % of a glycol component is 1,4-cyclohexane-dimethanol and at least 80 mole % of an acid component is terephthalic acid, a maximum value of a temperature dependent expansion in the surface direction of the film is $9 \times 10^{-6}$ to $35 \times 10^{-6}/°C.$, a maximum value of a humidity dependent expansion in the surface direction of the film is 0 to $8.0 \times 10^{-6}/\%$ RH, the difference between the maximum and minimum values of the temperature dependent expansion in the surface direction of the film is 0 to $8.0 \times 10^{-6}/°C.$, and the difference between the maximum and minimum values of the humidity dependent expansion in the surface direction of the film is 0 to $3.0 \times 10^{-6}/\%$ RH.

2. The magnetic recording flexible disc of claim 1 wherein the biaxially oriented film is characterized in that the maximum value of the temperature dependent expansion in the surface direction of the film is $20 \times 10^{-6}$ to $35 \times 10^{-6}/°C.$, the maximum value of the humidity dependent expansion in the surface direction of the film is 3 to $8.0 \times 10^{-6}/\%$ RH, the difference between the maximum and minimum values of the temperature dependent expansion in the surface direction of the film is 0 to $6.0 \times 10^{-6}/°C.$, the difference between the maximum and minimum values of the humidity dependent expansion in the surface direction of the film is 0 to $3.0 \times 10^{-6}/\%$ RH, the refractive index in the surface direction of the film is 1.585 to 1.650 and the density is 1.220 to 1.250.

* * * * *